(12) United States Patent
Yearsley et al.

(10) Patent No.: US 7,116,739 B1
(45) Date of Patent: Oct. 3, 2006

(54) AUTO BAUD SYSTEM AND METHOD AND SINGLE PIN COMMUNICATION INTERFACE

(75) Inventors: Gyle Dee Yearsley, Boise, ID (US); Joshua James Neki, Boise, ID (US)

(73) Assignee: ZiLOG, Inc., San Jose, CA (US)

(*) Notice: Subject to any disclaimer, the term of this patent is extended or adjusted under 35 U.S.C. 154(b) by 684 days.

(21) Appl. No.: 10/284,600

(22) Filed: Oct. 31, 2002

(51) Int. Cl.
*H04L 7/00* (2006.01)
*H04L 25/38* (2006.01)

(52) U.S. Cl. ...................... 375/354; 375/370
(58) Field of Classification Search .............. 375/225, 375/295, 316, 219, 340, 354–357, 360, 369, 375/370; 713/400
See application file for complete search history.

(56) References Cited

U.S. PATENT DOCUMENTS

| | | | | |
|---|---|---|---|---|
| 4,984,251 A * | 1/1991 | Perloff et al. | ............... | 375/260 |
| 5,157,651 A * | 10/1992 | Ghelberg et al. | ........... | 370/233 |
| 5,627,858 A * | 5/1997 | Mak et al. | .................. | 375/225 |
| 5,748,949 A * | 5/1998 | Johnston | ..................... | 713/502 |
| 5,940,485 A * | 8/1999 | Sapra et al. | ........... | 379/142.15 |
| 5,982,837 A * | 11/1999 | Earnest | ........................ | 375/377 |
| 6,208,671 B1 * | 3/2001 | Paulos et al. | ................ | 370/545 |
| 6,366,610 B1 * | 4/2002 | Loyer et al. | ................ | 375/225 |
| 6,581,100 B1 * | 6/2003 | Durin et al. | ................ | 709/230 |
| 6,816,935 B1 * | 11/2004 | Gulick | ....................... | 710/260 |
| 6,850,561 B1 * | 2/2005 | Typaldos et al. | ........... | 375/225 |
| 6,944,248 B1 * | 9/2005 | Sullivan | ..................... | 375/369 |
| 6,970,525 B1 * | 11/2005 | Kljajic et al. | ................ | 375/354 |
| 2003/0225953 A1 * | 12/2003 | Ho | .............................. | 710/305 |

* cited by examiner

*Primary Examiner*—Mohammed Ghayour
*Assistant Examiner*—Aslan Ettehadieh
(74) *Attorney, Agent, or Firm*—Silicon Edge Law Group LLP; T. Lester Wallace

(57) ABSTRACT

In an auto baud system and method, the baud rates between two communicating devices are synchronized by timing the transmission of a plurality of bits by counting the cycles of a reference clock. The number of cycles counted is then divided by the number of bits counted over and any remaining cycles are distributed evenly across the data being transmitted or received. The interface of the circuit is preferably implemented as a single pin, open drain interface which can be connected to an RS-232 communications link using external hardware.

4 Claims, 2 Drawing Sheets

AUTO BAUD SYSTEM AND METHOD AND SINGLE PIN COMMUNICATION INTERFACE

FIELD OF THE INVENTION

The invention relates to a single pin communication interface and a method of detecting the baud rate for an asynchronous communication link.

BACKGROUND OF THE INVENTION

As technology develops, semiconductor devices are shrinking and being put into smaller packages. Pin utilization becomes ever more important for low pin count devices.

Communication links typically require several signals for communication. For instance, RS232 requires at least two data signals, transmit and receive. I2C also requires two signals, a bi-directional data signal and a clock. SPI requires at least three signals, transmit, receive, and a clock. All these communication interfaces also require a common ground signal, but since that signal does not carry any information, we will ignore it in our discussions.

Communication links also require that both ends transfer data at the same rate. Some communication protocols such as I2C or SPI use a dedicated clock so both ends transfer data at the same rate. For asynchronous protocols like those used in RS232, both ends of the link must know beforehand what the transmission rate is since a dedicated clock is not used. The transmission rate of an asynchronous serial communications link is typically referred to as the baud rate.

Asynchronous protocols typically operate by using a reference clock in conjunction with a baud rate generator. Since the speed of the reference clock is known and the desired baud rate of the communication link is known, the baud rate generators can be programmed to divide the reference clock down to the baud rate.

There have been previous methods used to auto-detect the baud rate of asynchronous communication links. One prior art technique involves sending a synchronizing key stroke such as a space bar, and then measuring the duration of the first bit in the data stream. Using this time interval allows the baud rate to be set. However, the accuracy obtained by measuring just one bit may cause this detection method to fail if the baud rate is close to the speed of the reference clock.

The present invention seeks to address these issues by providing a single pin communication interface with accurate baud rate detection.

SUMMARY OF THE INVENTION

The present invention provides a single pin communication interface with automatic baud rate detection.

According to the invention, there is provided a baud rate detection circuit for determining the baud rate of a communications link using an asynchronous protocol. This baud rate detection circuit is comprised of a counter for counting the number of cycles of a reference clock of unknown frequency over a plurality of data bits, and a means for determining the number of reference clock cycles that corresponds to the baud rate of the communication link based upon the counted clock cycles. Thus, this baud rate detection circuit is comprised of a baud rate generator, a counter for counting reference clock cycles, and a means for determining the number of reference clock cycles over a plurality of data bits. It also includes means for dividing the counter value by said plurality of data bits and for adding any remainder value to the baud rate generator by adding clock cycles to the baud rate generator at various bit positions when transmitting or receiving data. The plurality of data bits may be eight bits and the dividing may comprise shifting the binary counter value three places to the right. The remainder bits from this division may be distributed over a plurality of data bits during the reception or transmission of data by adding clock cycles to the baud rate generator at strategic bit locations in order to minimize error. The circuit may have a receiver and transmitter capable of sending and receiving data using an asynchronous protocol like the one defined in the RS232 standard. The asynchronous protocol may be comprised of a start bit, a number of data bits, and one or more stop bits. The start bit may be active low and the one or more stop bits may be active high. There may be eight data bits. The counter used for baud rate detection may be configured to start when the start bit is received and count until a high bit is received. The data used for baud rate detection purposes may be 80 Hex, thereby providing a sequence of eight low bits (one low start bit combined with seven low data bits), followed by two high bits (one high data bit combined with one high stop bit). This sequence causes the counter to count over eight bits. The circuit may include a single pin communication interface which combines the transmit and receive signals of an RS-232 interface into a single signal capable of half-duplex, bi-directional communication.

Still further, according to the invention, there is provided a method of using a baud rate generator to generate a data rate based upon a measured time of a plurality of data bits counting the number of clock cycles of a reference clock over the duration of a plurality of data bits, dividing the number of clock cycles by the number of received bits, and adding clock cycles to the baud rate generator at strategic bit positions during the transmission and reception of a data byte according to the remainder value from the dividing step. Preferably the reference clock is counted over eight bits and the counter value is divided by eight by shifting three places to the right. The three remainder bits from the shift are then preferably added to the baud rate generator during the reception and transmission of a byte at strategic bit positions in order to minimize error.

Still further, according to the invention, there is provided a means for error recovery, comprising generating a break condition which has the capability of being transmitted at any time over an open drain interface.

DETAILED DESCRIPTION OF THE INVENTION

Figure 1:
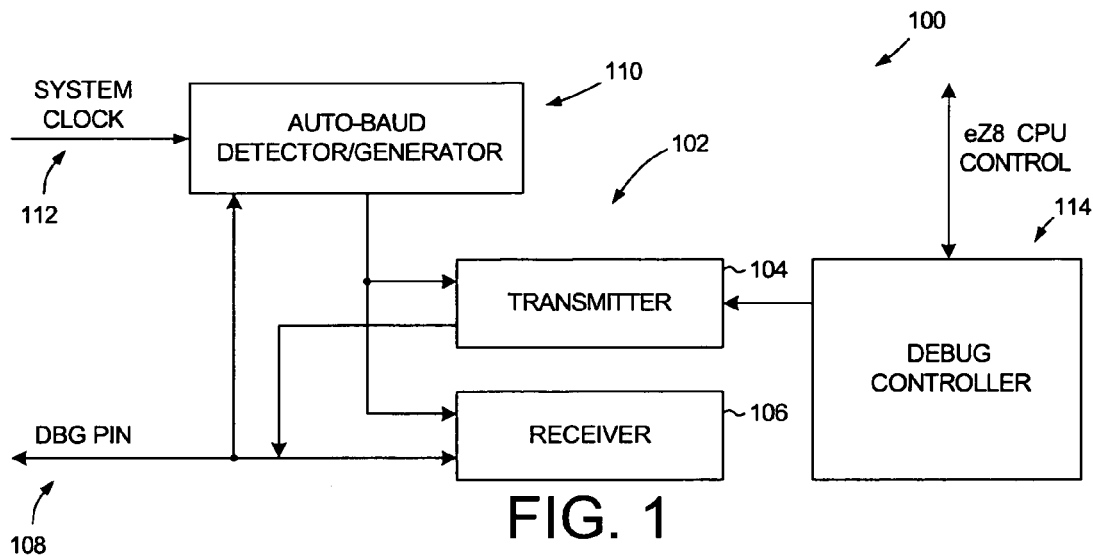
FIG. 1 is a block diagram of a circuit in accordance with the invention.

FIG. 1 shows a block diagram of a circuit 100 of the invention. The circuit includes a transmitter 104 and a receiver 106 connected to a single pin 108. The transmitter 104 and receiver 106 are controlled by a baud generator 110 which also includes a baud rate detector, and for convenience is collectively referred to as a baud rate detector/generator 110. In the present embodiment the various steps discussed further below are performed by the baud rate detector/generator 110. However, it will be appreciated that all or some of the steps could be performed by other structures.

The one-pin interface is a bi-directional, open-drain interface that transmits and receives data in half-duplex mode. Serial data is sent using the asynchronous data format defined in RS-232. Thus, minimal hardware is required to connect the single pin interface of the circuit of the invention with an RS232 link.

Figure 2:
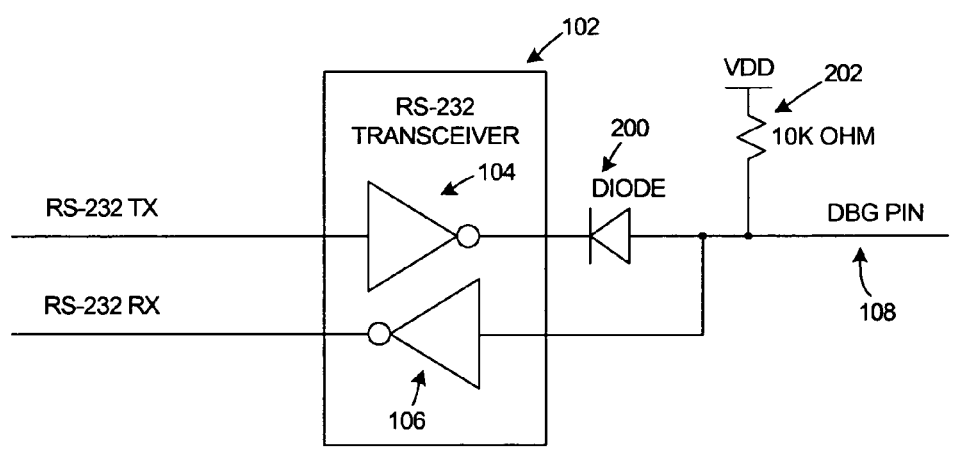
FIG. 2 is a schematic circuit diagram of a single pin interface.
Figure 3:
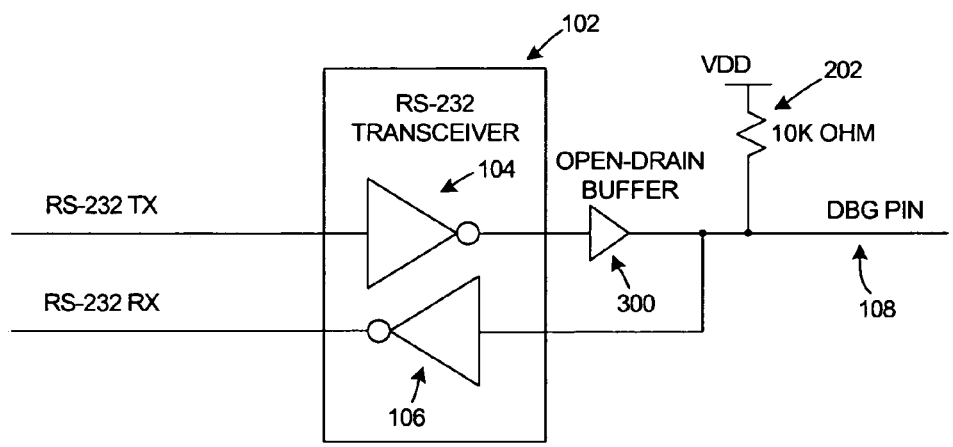
FIG. 3 is a schematic circuit diagram of another single pin interface.
Figure 4:
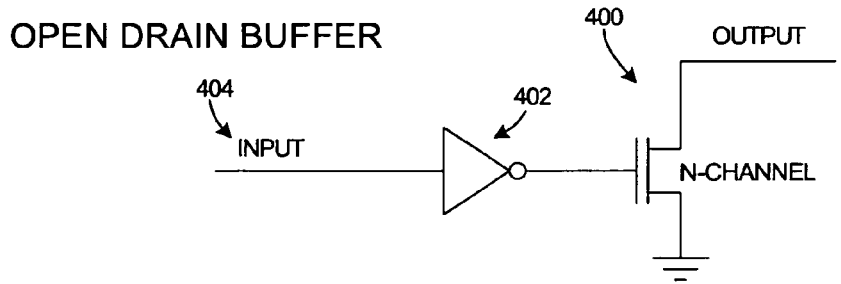
FIG. 4 is a schematic circuit diagram of a typical open drain buffer.

In order to communicate bi-directionally on the same wire, an open drain interface is used on each end of the link. A resistor is used to pull the line to a positive voltage. Each end of the link can only drive the line to ground. FIGS. 2 and 3 show two embodiments of implementations that could communicate with the single pin interface used in the invention. For convenience, the same reference numerals are used for like elements in FIGS. 2 and 3. In both cases the RS-232 transceiver 102 includes a driver 104 and receiver 106. However, in FIG. 2 the output from the driver 104 is connected to a diode 200, which ensures that the driver 104 does not drive the bi-directional link 108 with positive voltage signals. The external pull-up resistor 202 serves to pull the output line 108 up during positive voltage swings. In the FIG. 3 embodiment the output from the driver 104 is connected to an open drain buffer 300 which is depicted in greater detail in FIG. 4. As shown in FIG. 4, the open drain buffer comprises a n-channel transistor 400 connected directly to the output. Since the transistor 400 has an inverting effect, it is preceded by an inverter 402 to maintain the correct polarity. Thus, the open drain buffer 300 sinks current when a low voltage appears at the input 404, causing the output 108 to go low (it will sink all the current from the pull-up resistor 202). When a high voltage appears at the input 404, the transistor 400 switches off to avoid the driver output driving the receiver input. Thus in both embodiments the combined link 108 is connected to VDD by a pull-up resistor 202.

In order to further explain the invention in context, it will be described with reference to its implementation in Zilog's Z8 Encore.

The circuit of this embodiment 100 requires that the first character received from the host be 80 Hex. Thus, in this embodiment the present invention will configure the Baud Rate Detector/Generator 110 upon reception of the character 80 Hex. Reconfiguring the Baud Rate Detector/Generator can be done by the circuit detecting a break condition, which will reset the Baud Rate Detector/Generator. The character 80 Hex can then be resent to reconfigure the Baud Rate Detector/Generator.

As mentioned above, the circuit of the present embodiment uses the asynchronous data format defined for RS-232. Each character is transmitted in a frame comprising a start bit, eight data bits (least significant bit first) and one to two stop bits. The start bit is active low and the stop bit(s) active high. Thus the reconfiguring frame in such an implementation comprises a low start bit, followed by seven low data bits and one high data bit, and ending with one high stop bits. Thus there are eight continuous low bits before a high bit is received.

The Baud Rate Detector/Generator 110 includes a counter which counts the clock cycles of a reference clock during the transmission of the eight continuous low bits. The minimum baud rate that the system can be configured for is dependent on the length of this counter and the frequency of the reference clock.

Figure 5:
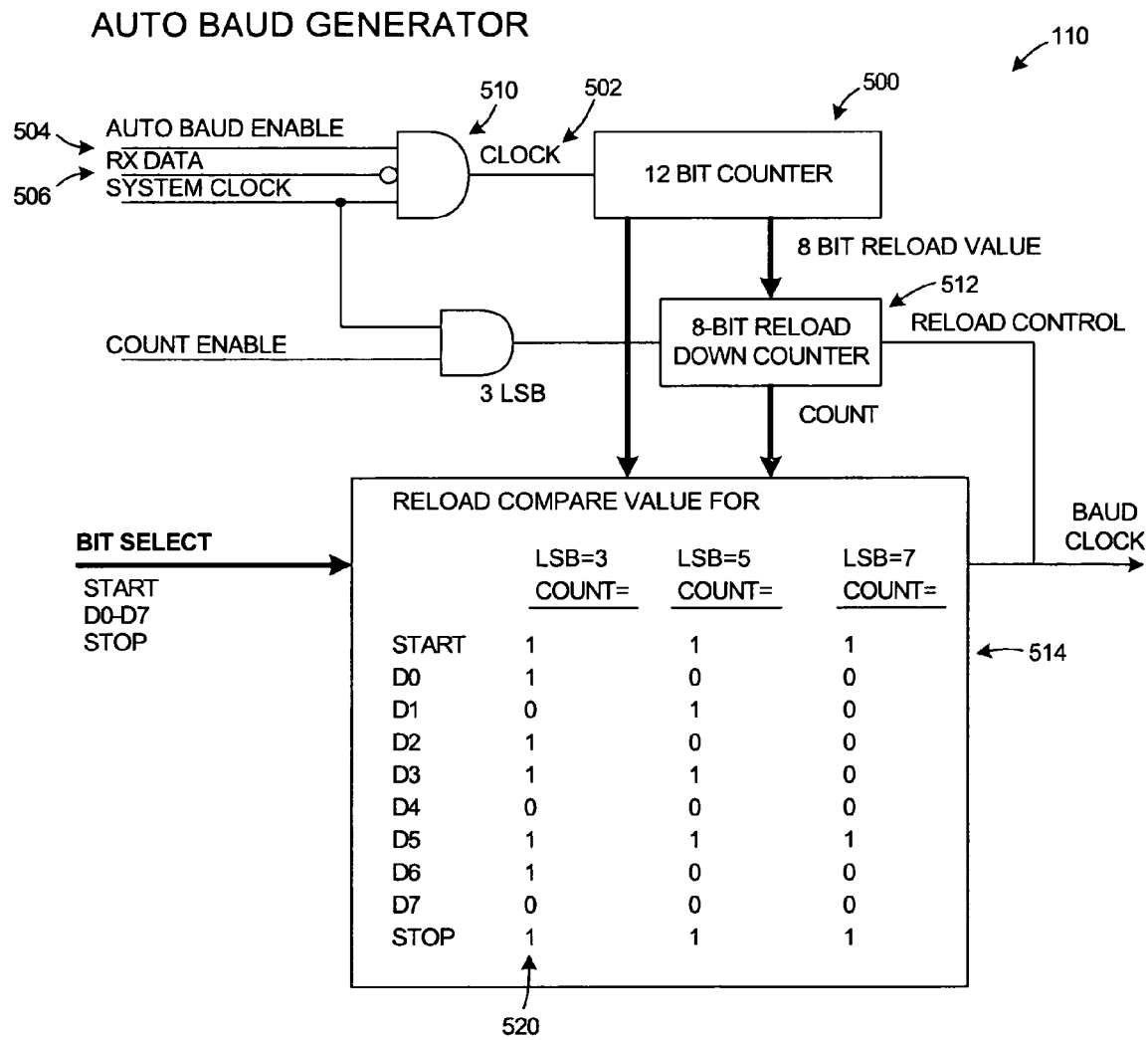
FIG. 5 is a circuit diagram of one embodiment of an auto baud generator of the invention.

According to the invention, the number of clock cycles counted during the reception of the eight low bits when the character 80 Hex is received is divided by eight in order to obtain the baud rate. Any remainder from this division is evenly distributed across characters received or transmitted by adding clocks to the baud rate generator at strategic bit locations in the character. This can be understood more clearly with reference to FIG. 5, which shows one embodiment of the baud rate detector/generator 110 of the invention. The baud rate detector/generator 110 includes a 12 bit counter 500 that holds a value corresponding to the detected baud rate, as is discussed further below. The baud rate detector is configured by enabling it for counting using Auto Baud Enable signal 504 so that it will count the number of reference clocks 502 when the receive data signal 506 is low. Thus, when the baud rate configuration character 80 Hex is received, the counter counts during the eight continuous low bits. This results in a value stored in the counter that is eight times the baud rate. A bit clock can be derived by dividing the detected count by eight, which can be done by simply shifting the binary value three places to the right. The nine most significant bits from the counter 500 are fed into a nine bit reload down counter 512. The three least significant bits in the detector counter are the remainder bits from the division. By comparing this remainder 514 with the bit position of the character currently being transmitted or received, the baud rate generator may add a clock cycle at strategic bit positions to compensate for error. FIG. 5 shows three examples of interspersing for remainder values of three, five, and seven. For example, if the remainder is three, it means that three additional clock cycles were received when the baud rate was detected across eight bits, however, three clocks do not divide evenly across eight data bits. To compensate for these extra clocks, a comparator compares the bit position with the remainder from the detected baud rate to determine when it should insert clocks, as shown in the column 520. With a remainder of three, the nine bit down counter 512 will count down one extra clock cycle when transmitting or receiving bit positions D1, D4, and D7, thereby distributing these three extra clocks over eight bit positions. Thus, for example, if during the reception of the baud rate configuration character (80Hex) the clock goes through 67 counts, the nine most significant bits define the gross number of clock cycles for transmitting eight bits, while the least significant three bits constitute the remainder which will be distributed across eight bits. Thus, in this example, 67 cycles occur for every eight bits, thereby constituting 8 cycles for each bit with 3 remaining cycles that should be distributed evenly across the eight bits.

Thus the present invention provides for a simple way of providing for baud rate detection and for providing a single pin interface. It will be appreciated that the invention can be used for automatic baud rate detection of UARTs in general and that the implementations and embodiments discussed above were by way of example only. The invention can therefore be implemented in different ways without departing from the general scope of the invention.

Furthermore, the present invention provides for a way of recovering from communication error conditions. Asynchronous protocols commonly make use of start and stop bits having opposite polarities with a predetermined number of data bits in between. For instance, in one protocol, the idle state of the communications line is the same polarity as the stop bit and the opposite polarity of the start bit. If the communications line is held in the non-idle state for more than the length of time it takes to transmit the start bit and all data bits, this is considered an error condition most commonly referred to as a break condition.

In fact, in asynchronous protocols, there are various communication error conditions that can occur. These include framing errors, parity errors, and break conditions. Due to the open drain interface of this communication link, there is also the possibility that transmit collision errors can occur. The present invention provides a means in order to notify the remote end of the link that an error occurred. This signaling is done by placing the communications line into the non-idle state for a length of time long enough to generate a break condition. Due to the open drain nature of the interface, a break condition can be sent at any time, even if the communication peripheral is currently receiving or transmitting data. The remote end of the link will then detect that a communications error occurred and can take appropriate action to attempt to recover from the error.

It will be appreciated that the embodiments and applications discussed above were by way of example only and that other implementations and embodiments can be provided without departing from the scope of the invention.

What is claimed is:

1. A method comprising:
   (a) receiving a frame of an incoming asynchronous serial signal onto a single pin communication interface, wherein the single pin communication interface is implemented as an open drain interface and is usable for half-duplex, bi-directional communication, the frame including a plurality of bits, the plurality of bits including a start bit, a number of data bits, and at least one stop bit;
   (b) counting a number A of reference clocks during a time that a number N of the plurality bits is being received, wherein the number N is greater than one, wherein the reference clocks are reference clocks of a reference clock signal, wherein each cycle of the reference clock signal has a reference clock period T;
   (c) dividing the number A of clock cycles by the number N, thereby obtaining a baud rate value C and a remainder value R;
   (d) using the baud rate value and the remainder value to generate an outgoing asynchronous serial signal, wherein the outgoing asynchronous serial signal comprises a frame, the frame comprising the number N of bits, each bit of the frame of the outgoing asynchronous serial signal having a duration of either a first duration or a second duration, wherein the first duration is a time substantially equal to the reference clock period T times the baud rate value C, wherein the second duration is a time substantially equal to the reference clock period T times the baud rate value C plus one, wherein there are approximately R bits of the second duration in the frame of the outgoing asynchronous serial signal, and wherein the R bits of the second duration are spread over the N bits of the frame of the outgoing asynchronous serial signal;
   (e) outputting the outgoing signal onto the single pin communication interface; and
   (f) detecting a break condition by detecting a condition when a voltage on the single pin communication interface is held at a first polarity for more than the length of time it takes to transmit a frame of the outgoing asynchronous serial signal, wherein the start bit of the received frame is of the first polarity.

2. The method of claim 1, wherein the number N of the plurality of bits in (b) includes the start bit and seven data bits.

3. The method of claim 1, wherein the number N is eight, wherein the N bits of the received frame include the start bit and seven data bits, wherein the seven data bits are of the first polarity, wherein the frame further comprises an eighth data bit and at least one stop bit, wherein the eighth data bit and said at least one stop bit are of a second polarity opposite the first polarity.

4. The method of claim 3, wherein the frame is received in step (a) onto a debug pin of a circuit, the circuit comprising a debug controller, an auto-baud detector/generator, a receiver and a transmitter, wherein steps (b)–(d) are performed by the auto-baud detector/generator.

* * * * *

UNITED STATES PATENT AND TRADEMARK OFFICE
CERTIFICATE OF CORRECTION

PATENT NO.       : 7,116,739 B1                                    Page 1 of 1
APPLICATION NO.  : 10/284600
DATED            : October 3, 2006
INVENTOR(S)      : Yearsley et al.

It is certified that error appears in the above-identified patent and that said Letters Patent is hereby corrected as shown below:

On Title Page

Item 75 Inventor please delete "Neki" to -- Nekl --

Signed and Sealed this

Thirtieth Day of January, 2007

JON W. DUDAS
*Director of the United States Patent and Trademark Office*